(12) United States Patent
Maleus

(10) Patent No.: US 8,350,535 B2
(45) Date of Patent: Jan. 8, 2013

(54) BATTERY CHARGING AND ELECTRICAL ENERGY DELIVERY SYSTEM FOR DELIVERING ELECTRICAL ENERGY TO CONSUMERS AND CHARGING CURRENT TO A BATTERY AND A BATTERY OPERATED SYSTEM

(75) Inventor: Börje Maleus, Jarfalla (SE)

(73) Assignee: CTEK Sweden AB, Vikmanshyttan (SE)

( * ) Notice: Subject to any disclaimer, the term of this patent is extended or adjusted under 35 U.S.C. 154(b) by 606 days.

(21) Appl. No.: 12/564,360

(22) Filed: Sep. 22, 2009

(65) Prior Publication Data

US 2011/0068749 A1   Mar. 24, 2011

(30) Foreign Application Priority Data

Sep. 18, 2009   (EP) .................................... 09170640

(51) Int. Cl.
*H02J 7/04* (2006.01)
*H02J 7/16* (2006.01)
(52) U.S. Cl. ........................................ 320/162; 320/133
(58) Field of Classification Search .................... 320/162
See application file for complete search history.

(56) References Cited

U.S. PATENT DOCUMENTS

| 4,896,637 | A | * | 1/1990 | Yamamoto ................. 123/179.3 |
| 6,037,749 | A | | 3/2000 | Parsonage |
| 6,140,801 | A | | 10/2000 | Aoki et al. |
| 6,476,519 | B1 | * | 11/2002 | Weiner ............................ 307/66 |
| 2003/0107352 | A1 | * | 6/2003 | Downer et al. ................. 322/40 |
| 2004/0113585 | A1 | * | 6/2004 | Stanesti et al. ................ 320/116 |
| 2004/0212345 | A1 | | 10/2004 | Ozeki et al. |
| 2005/0046391 | A1 | * | 3/2005 | Veselic et al. ................. 320/133 |
| 2005/0151517 | A1 | | 7/2005 | Cook et al. |
| 2005/0242772 | A1 | | 11/2005 | Cha |
| 2005/0279544 | A1 | | 12/2005 | Pott et al. |
| 2006/0080051 | A1 | | 4/2006 | Breen et al. |
| 2007/0096692 | A1 | * | 5/2007 | Chuang et al. ................. 320/128 |
| 2007/0296377 | A1 | * | 12/2007 | Hashimoto et al. ........... 320/159 |
| 2008/0157723 | A1 | | 7/2008 | Xing et al. |
| 2008/0191555 | A1 | | 8/2008 | Cha |

FOREIGN PATENT DOCUMENTS

| DE | 10262000 A1 | 2/2004 |
| EP | 0623985 A1 | 11/1994 |
| EP | 1 447 897 A1 | 8/2004 |

OTHER PUBLICATIONS

European Extended Search Report, dated Nov. 3, 2010, in EP 09170640.
European Search Report in Corresponding Application No. EP 09 17 0640 dated Apr. 30, 2010.

* cited by examiner

*Primary Examiner* — Arun Williams
(74) *Attorney, Agent, or Firm* — Young & Thompson

(57) ABSTRACT

A battery charging and electrical energy delivery system (25) that allows for separation of charging of a battery (23) and delivery of electrical energy to a first set of consumers (24). The battery may be charged via a first path (29) for connecting the battery with an energy source (22), while electrical energy may be supplied via a second path (30) (separate from the first path) from the energy source to the first set of consumers. The first set of consumers may also be powered by the battery via third path (31) e.g. if the energy source is off. A control unit (32) is adapted to control the supply of electrical energy along the first, second and third paths in response to a detected state of the energy source. A battery operated system (21*a*) including the battery charging and electrical energy delivery system (25) is also provided.

19 Claims, 4 Drawing Sheets

BATTERY CHARGING AND ELECTRICAL ENERGY DELIVERY SYSTEM FOR DELIVERING ELECTRICAL ENERGY TO CONSUMERS AND CHARGING CURRENT TO A BATTERY AND A BATTERY OPERATED SYSTEM

TECHNICAL FIELD

The present invention relates to the a battery charging and electrical energy delivery system for delivering electrical energy to consumers and charging current to a battery and also to a battery operated system comprising such a battery charging and electrical energy delivery system.

BACKGROUND

Vehicles such as boats and motor homes are usually provided with several different types of consumers of electrical energy, such as lamps, refrigerators, bilge pumps, navigation equipment, cooking equipment and other types of electrical equipment. A re-chargeable lead-acid service battery is often provided to supply the different consumers with electrical energy. In order to ensure proper operation of all the electrical equipment in the vehicle the battery should be charged regularly. Charging arrangements can be provided so that when the engine of the vehicle is running the battery is charged.

There are many aspects to consider in order to prolong the service life and retain the performance of the battery. The battery may remain idle for long periods e.g. during the winter time in the case of a boat. During the summer time the battery may instead be put under a lot of strain by the electrical equipment installed in the vehicle and may be used very frequently without the engine being turned on. This is naturally very taxing for the battery.

In the 1990s, battery charging underwent a robust period of development, which introduced a new type of maintenance and care, wherein focus was put on efficient charging the battery in such a way that the service life of the battery was prolonged and such that the battery could provide the maximum performance for all of this time. Multi-stage charging as disclosed in the U.S. Pat. No. 7,541,778 provides such efficient battery charging.

Nowadays people have come to rely on everything working properly to ensure that they have the time to do everything they have planned. Therefore, people's expectations and requirements on all the vehicles around them have increased. Correct battery care can avert many disappointments and problems. People also have different expectations and requirements on different types of electrical equipment in the vehicle. While it may be somewhat annoying if the refrigerator is not working in the boat, a bilge pump unable to operate may lead to a really hazardous situation.

There's a built-in conflict between battery charge and load use voltage. The charge voltage for a battery depends on the temperature and should normally be at about 14.4V at 25 degrees C. A cold battery should with preference be charged at a higher voltage and a warm at a lower voltage. 12V consumers like light bulbs, electronics and LED light have significantly longer expected life if the voltage is lower. Typically the expected life of a light bulb is reduced by 50% if the voltage is increased 5%.

Consequently there are several different needs and requirements with respect to electrical energy consumption to consider in a vehicle. The battery has certain demands that need to be fulfilled in order to achieve efficient charging that differ from the demands of other electrical equipment. Furthermore there are different expectations and requirements on different types of electrical equipment as explained above. It is thus a challenging problem how to supply electrical energy to consumers and for charging the battery and at the same time fulfill differing demands and requirements.

SUMMARY

An object of the present invention is to provide means that allow for delivery of electrical energy to facilitate efficient charging of a battery and supply of electrical energy to a number of consumers.

The above stated object is achieved by means of a battery charging and electrical energy delivery system and a battery operated system according to the independent claims.

A first embodiment of the present invention provides a battery charging and electrical energy delivery system. The delivery system comprises a first connection for connection to an energy source, a second connection for connection to a battery and a third connection for connection to a first set of consumers of electrical energy. The delivery system also comprises a first path for supplying charging current from the energy source to the battery when connected to the first and second connections respectively. A second path, separate from the first path, is also provided for supplying electrical energy from the energy source to the first set of consumers when connected to the first and third connections respectively. Furthermore a third path is provided for supplying electrical energy from the battery to the first set of consumers when connected to the second and third connections respectively. The deliver system includes a control unit (32) for controlling the supply of electrical energy along the first, second and third paths in response to a detected state of the energy source.

A second embodiment of the present invention provides a battery operated system comprising a battery charging and electrical energy delivery system as described above, as well as an energy source connected to the first connection, a battery connected to the second connection, and a first set of consumers connected to the third connection.

An advantage of embodiments of the present invention is that they allow for separation of charging of a battery and supply of electrical energy to a number of consumers. Thereby it is possible to provide more efficient charging of the battery.

Another advantage of certain embodiments of the present invention is improved battery protection can be provided by disconnecting non-critical consumers from the battery in cases where the battery is becoming seriously discharged.

Another advantage of certain embodiments of the present invention is improved charging of a starter battery from a service battery. The starter battery has usually priority in a system. Energy could be transferred from a service battery to the starter battery.

These and other advantages with, and aspects of, the present invention will become apparent from the following detailed description and from the accompanying drawings.

BRIEF DESCRIPTION OF THE DRAWINGS

In the following description of an embodiment of the invention, reference will be made to the accompanying drawings of which.

DETAILED DESCRIPTION

Figure 1:
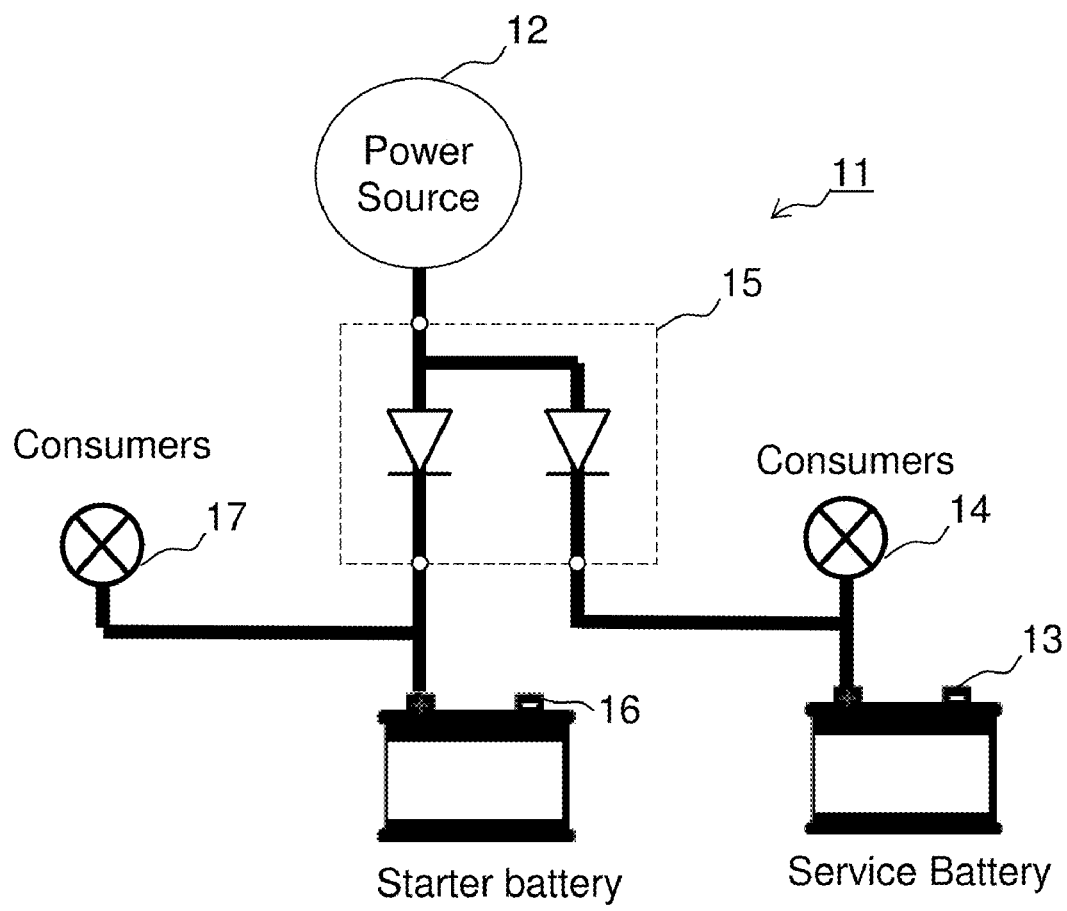
FIG. 1 is a schematic block diagram of a battery operated system with a battery charging and electrical energy delivery system according to prior art.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

FIG. 1 is a schematic illustration of a battery operated system 11 according to prior art. It is here assumed that the system 11 is installed in a vehicle such as a recreational vehicle, a car, an ambulance or a boat. The system comprises an alternator 12 and a starter battery 16 which is adapted to charge a battery 13 when its engine is running. A number of consumers 14 of electrical energy are connected to the battery 13, and a number of consumers 17 could also be connected to the starter battery 16. The consumers 14 and 17 represent the electrical system of the vehicle. The system 11 also comprises a battery separator device 15 which separates the starter battery 16 and the battery 13 when the alternator is not running. The battery separator device 15 could be implemented with relays, diodes, transistors, switches or other devices. The current that goes through the battery separator device 15 to the battery 13 and the consumers 14 have the same voltage, which could restrict the efficiency of the charging of the battery 13.

A basic idea of the present invention is to allow for improved efficiency in the charging of the battery 13 by providing a possibility to separate charging and consumption.

Figure 2:
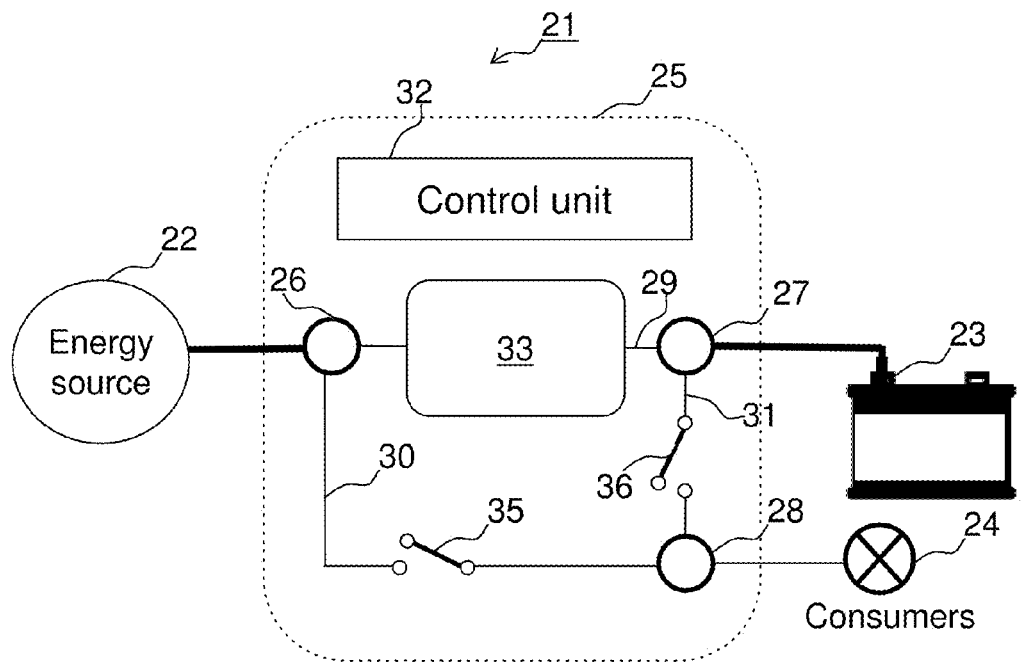
FIG. 2 is a schematic block diagram of a battery operated system with a battery charging and electrical energy delivery system according to an embodiment of the present invention.

FIG. 2 is a schematic block diagram illustrating a battery operated system 21 according to an embodiment of the present invention. The system 21 comprises an energy source 22, which for instance may be an alternator, a solar or wind generator or a generator connected to an engine of a vehicle. The energy source can provide charging current to a battery 23 and electrical energy to a number of consumers 24 when it is in an on state (e.g. when the engine is running in case the energy source 22 is an alternator in a vehicle). The system 21 also comprises a battery charging and electrical energy delivery system 25 comprising a first connection 26 for connection to the energy source 22, a second connection 27 for connection to the battery 23 and a third connection 28 for connection to the consumer(s) 24. The delivery system 25 also includes a first path 29 extending between the first and second connections 26, 27 for supplying electrical energy from the energy source 22 to the battery 23 for charging the same. A second path 30 extends between the first connection 26 and the third connection 28 for supplying electrical energy from the energy source 22 to the consumer(s) 24. Furthermore a third path 31 is provided between the second and third connections 27, 28 for conducting electrical energy from the battery 23 to the consumer(s) 24. A control unit 32 is adapted to control the supply of electrical energy along the first, second and third paths 29-31. By disconnecting the third path it is possible to separate the supply of electrical energy between the energy source 22 and the consumers 24 from the supply of electrical energy between the energy source 22 and the battery 23, thus separating charging and consumption.

In this description it should be noted that throughout this description "the number of consumers" 24 (or "set of consumers" 24) is intended to encompass scenarios with a single consumer of electrical energy as well as scenarios with a plurality of consumers.

The control unit is 32 is provided with means for detecting a state of the energy source 22 and control the supply of electrical energy along the paths 29, 30, 31 in response to the detected state. When the energy source 22 is on the control unit 32 is adapted to connect the first and second paths 29, 30 and disconnect the third path 31. Thereby the battery 23 is charged via the first path 29 and the consumers 24 are powered by the energy source 22 via the second path 30. When the energy source 22 is off the control unit 32 connects the third path 31 so that the consumers 24 are powered by the battery 23 via the third path 31.

According to one embodiment each path may be provided with a relay 33, 35, 36 for connecting or disconnecting the path. In FIG. 2 it is illustrated that the first path is provided with a device 33. The device 33 may e.g. be a relay, a DC/DC-charger or a relay and a DC/DC-charger in parallel. If a DC/DC-charger is provided it is preferably an intelligent charger that is able to monitor the battery state and control the charging to achieve efficient charging and battery care.

There are several different ways in which the control unit 32 may detect the state of the energy source 22 as will be appreciated by a person skilled in the art. The control unit 32 may e.g. be adapted to monitor the voltage level at the first connection 26. If a voltage level above a predetermined threshold level is detected, it may be interpreted as the energy source 22 being on (i.e. that the engine is running in case the energy source 22 is an alternator of a vehicle). If the voltage level drops below a certain level, it may be interpreted as the energy source being off (the engine has been turned off in the vehicle example). According an embodiment of the invention the delivery system 25 may include a voltage sensitive relay that engages when e.g. a voltage level of 13.7 volts is reached, thus connecting the first and second paths 29, 30. When the voltage drops below e.g. 12.8 volts the voltage sensitive relay disengages, thus disconnecting the first and second paths 29, 30 and connecting the third path 31. Other ways of monitoring the state of the energy source include monitoring a charging indicator such as a lamp or information screen. If the energy source 22 is an alternator, a charging indicator is normally connected to a D+-output of the alternator.

The control unit 32 may be adapted to apply a certain delay before connecting or disconnecting the consumers 24 from the battery 23 in case a state change of the energy source 22 is detected, e.g. a 5 second delay after detecting a state change from off to on and a 10 second delay after detecting a state change from on to off. A purpose of using such a delayed mode switch is to avoid that short temporary voltage peaks/dips could cause the delivery system 25 to switch mode.

The control unit 32 may furthermore be adapted to monitor the battery 23 and protect it from being too discharged by disconnecting the third path 31 in case a voltage level of the battery 23 drops below a predetermined state of charge threshold, thus disconnecting the consumers 24 from the battery 23.

Figure 3:
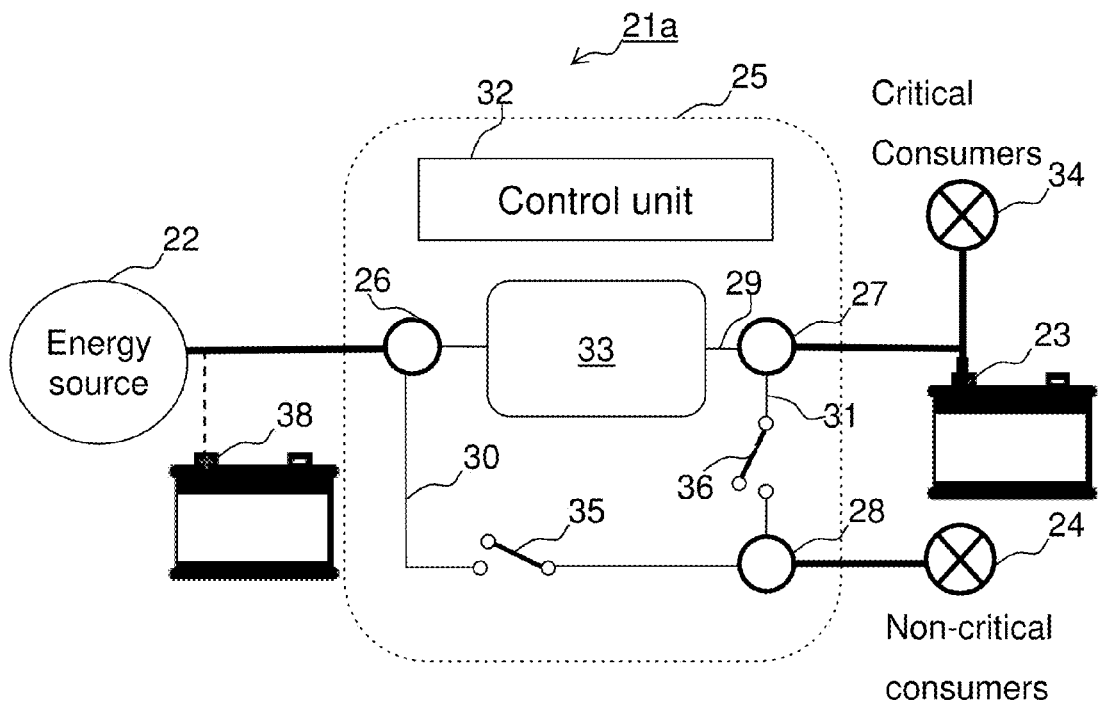
FIG. 3 is a schematic block diagram of a battery operated system with a battery charging and electrical energy delivery system according to another embodiment of the present invention

FIG. 3 illustrates another embodiment of a battery operated system 21a according to the present invention, which is similar to the system 21 in FIG. 2 apart from there being provided two sets of consumers 24 and 34. Here the set of consumers 24 is a number of non-critical consumers connected to the third connection 28, while the set of consumers 34 is a number of critical consumers directly connected to the battery 23. Critical consumers are electrical equipment which should not bee disconnected even if the battery is becoming seriously discharged, while non-critical consumers usually are additional equipment which can be disconnected without affecting the main function of the system 21a. If the system 21a is included in a boat critical consumers may be a bilge pump, emergency light and navigation system e.g., while non-critical consumers may be a refrigerator, lamps, heating and fans. If the third path is disconnected to protect the battery 23 from being too discharged the set of critical consumers 34 is unaffected. The benefits of this arrangement can be easily appreciated. The set of non-critical consumers 24 is completely separated from the battery 23 during charging, which makes it possible to achieve more efficient charging of the battery. At the same time it can be ensured that critical consumers 34 are given priority when the battery 23 is becoming seriously discharged and the energy source 22 is off by making it possible to cut the power supply to non-critical consumers.

In FIG. 3 it is furthermore illustrated that a second battery, such as a starter battery 38 may be connected to the first connection 26. The control unit 32 may be adapted to monitor the voltage at the first connection 26 and at the second connection 27. If it is detected that the state of charge (SOC) of the starter battery has dropped below a certain limit, while the voltage of the battery 23 is higher, electrical energy could be transferred from connection 27 to connection 26 by closing the first path 29 through device 33. Thus it is possible to achieve maintenance charging of the starter battery 38 under the control of the control unit 32. A starter battery is often given priority in battery operated systems and by allowing for charging of the starter battery by the battery 23 situations where the starter battery become too discharged may be avoided.

Figure 4:
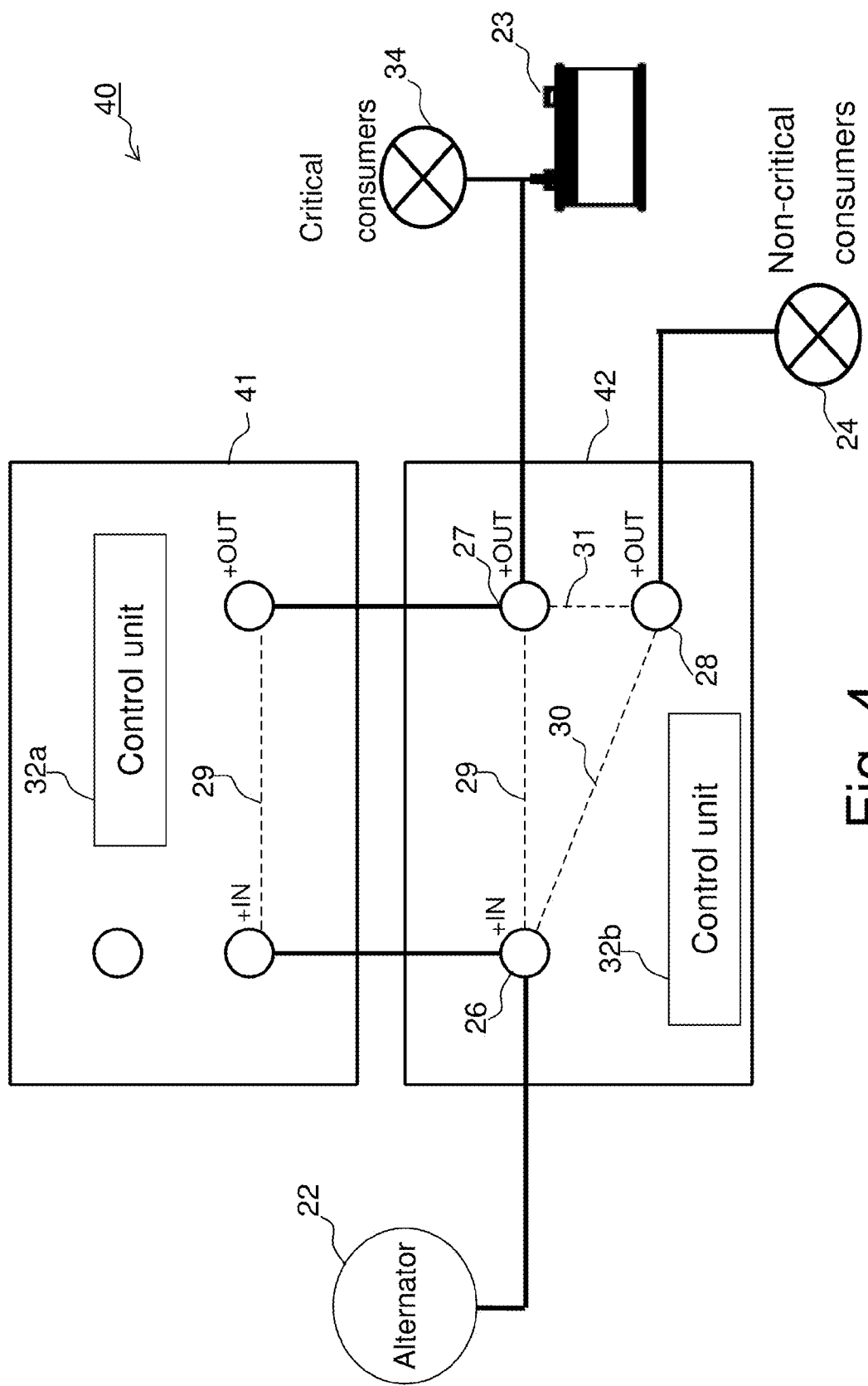
FIG. 4 is a schematic block diagram of yet another embodiment of a battery charging and electrical energy delivery system according to the present invention.

FIG. 4 is a schematic block diagram of how a battery operated system 40 according to the invention (such as the one shown in FIG. 3) can be implemented using two separate units 41 and 42. The unit 41 is an intelligent DC/DC-charger and the unit 42 is a battery switch, comprising the first, second and third connections 26-28 discussed above. Each unit 41, 42 is provided with a housing, and closing links are used to connect the different ports on the units as illustrated in FIG. 4.

In FIG. 4 it is illustrated that the units 41 and 42 each include a control unit 32a and 32b respectively. The control units 32a and 32b comprise functionality which all in all corresponds to the control unit 32 in FIG. 2 and FIG. 3.

Figure 5:
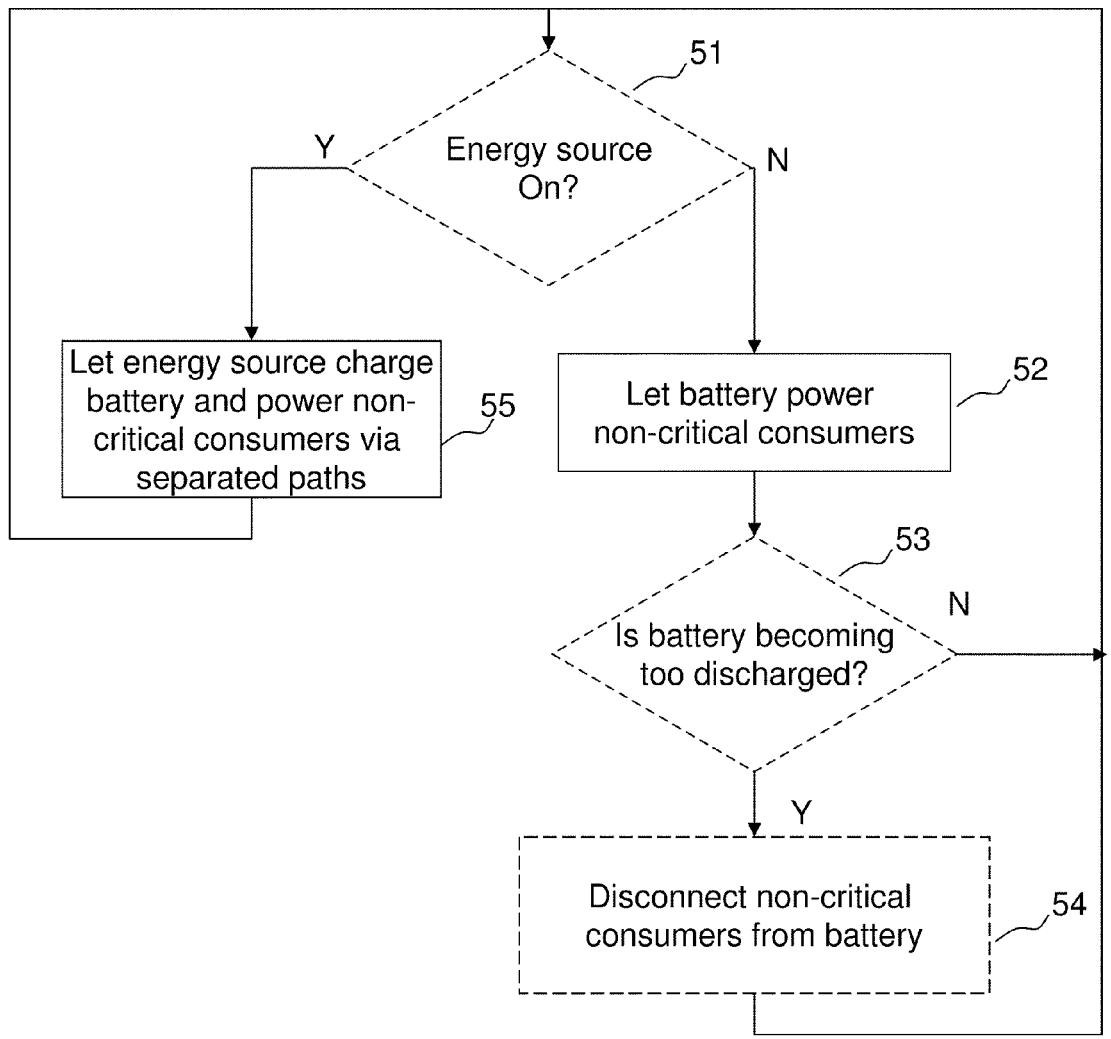
FIG. 5 is a flow diagram of a method of controlling delivery of electrical energy to a number of consumers and for charging a battery.

Now an operation scenario will be described in connection with a flow diagram shown in FIG. 5, which illustrates a method of controlling the system 40. In this operation scenario it is assumed that the system 40 is installed in a boat and that the energy source is an alternator connected to the boat engine. The operation scenario includes consecutive scenes a)-f), which are described merely as examples to illustrate how the system 40 may operate. It should especially be noted that all numeric specifications of time, voltage/current levels, limits and thresholds are merely examples. Other levels, limits and thresholds may be applied in other embodiments. The scenes are as follows:

a) The engine is off. The control unit 32 checks the state of the energy source 22 in a step 51. The voltage level at the first connection 26 is below 13.7V which in this example is interpreted as the engine being off. The non-critical consumers 24 are powered by the battery 23 via the third path 31, e.g. by means of a 10 A current at 12.4 V (step 52). The control unit 32 may also monitor that the battery 23 does not become too discharged in an optional step 53.

b) The engine starts. The voltage at the first connection 26 rises to 13.8V which the control unit 32 detects as the energy source 22 being on (step 51). However in this scenario there is a 5 second delay before the DC/DC-charger 41 starts and before the battery switch 42 reacts.

c) 5 seconds after the engine has started, the non-critical consumers are supplied with electrical energy from the alternator 22, in this example 10A current at 13.8V (step 55). The battery 23 is charged with the DC/DC-charger 41 at a maximum of 20 A according to this example scenario (step 55). However it is also possible to lead a current of e.g. 30 A through the battery switch 42 in parallel with the 20 A through the DC/DC-charger 41 so that battery receives 50 A from the energy source 22 and a total current of 60 A is drawn from the energy source (10 A to the set of non-critical consumers 24+50 A to the battery 23).

d) The engine is turned off. This is detected by the control unit detecting that the voltage level drops below 12.8V at the first connection 26 (step 51). There is a 10 second delay before the units 41 and 42 reacts.

e) After 10 seconds, the non-critical consumers (24) are then again powered by the battery 23 (step 52).

f) The voltage level at the battery (23) has dropped to 11.6V which is a predetermined state of charge threshold that indicates that the battery has reached a critical level and is becoming too discharged. This state is detected by the control unit 32 in step 53, and the non-critical consumers 24 are disconnected from the battery in a step 54. However the critical consumers are still powered from the battery 23.

From the different embodiments it has been shown that the control unit 32 can be implemented as a single unit or divided into several units. It is possible for the control unit to be a separate unit or integrated into and distributed over other components in the delivery system 25. The term control unit is rather to be understood as the collective function of controlling the electrical energy supply on the first, second and third paths. The control unit may be implemented using e.g. one or several microprocessors or using discrete circuits as will be understood by the person skilled in the art.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A battery charging and electrical energy delivery system comprising
    a first connection for connection to an energy source;
    a second connection for connection to a battery;
    a third connection for connection to a first set of consumers of electrical energy;
    a first path for supplying charging current from the energy source to the battery when connected to the first and second connections respectively;
    a second path, separate from said first path, for supplying electrical energy from the energy source to the first set of consumers when connected to the first and third connections respectively;

a third path for supplying electrical energy from the battery to the first set of consumers when connected to the second and third connections respectively;

a control unit for controlling the supply of electrical energy along said first, second and third paths in response to a detected state of the energy source, wherein said control unit is adapted to control the supply of electrical energy along said first, second and third paths such that the battery is charged via the first path and the first set of consumers receives electrical energy via the second path, in response to detecting that the energy source is on; and the first set of consumers receives electrical energy via the third path, in response to detecting that the energy source is off; and wherein said control unit is adapted to switch the supply of electrical energy to the first set of consumers from supply via the third path to supply via the second path in response to detecting a state change of the energy source from off to on and that the on state is maintained for a predetermined first period of time.

2. The battery charging and electrical energy delivery system according to claim 1, wherein the control unit is adapted to detect the state of the energy source by monitoring a voltage level in relation to a predetermined threshold level, or by monitoring a charging indicator.

3. The battery charging and electrical energy delivery system according to claim 1, wherein the control unit is adapted to switch the supply of electrical energy to the first set of consumers from supply via the second path to supply via the third path in response to detecting a state change of the energy source from on to off and that the off state is maintained for a predetermined second period of time.

4. The battery charging and electrical energy delivery system according to claim 1, further comprising a device on the first path which is adapted to break or connect the supply of charging current along the first path, wherein said device comprises a DC/DC charger.

5. The battery charging and electrical energy delivery system according to claim 4, wherein said device is a first relay.

6. The battery charging and electrical energy delivery system according to claim 4, wherein said device comprises a DC/DC charger in parallel with a relay.

7. The battery charging and electrical energy delivery system according to claim 1, comprising a second relay 35 and third relay 36 adapted to break or connect the supply of electrical energy along the second and third paths respectively.

8. The battery charging and electrical energy delivery system according to claim 1, wherein the control unit is further adapted to monitor a state of charge of the battery when connected to the second connection and to break supply of electrical energy to the first set of consumers if the state of charge drops below a predetermined state of charge threshold.

9. The battery charging and electrical energy delivery system according to claim 1, wherein the control unit is adapted to monitor a state of charge of a second battery when connected to the first connection and to control the flow of electrical energy on the first path to transfer electrical energy from the second connection to the first connection to charge the second battery.

10. The battery charging and electrical energy delivery system according to claim 1 further comprising, an alternator, photovoltaic panel, wind generator or generator connected to the first connection, a battery connected to the second connection, and a first set of consumers connected to the third connection.

11. The battery charging and electrical energy delivery system according to claim 10, further comprising a second set of consumers directly connected to the battery (23) to receive electrical energy from the battery independently of the battery charging and electrical energy delivery system.

12. The battery charging and electrical energy delivery system according to claim 11, wherein said first set of consumers are non-critical consumers and said second set of consumers are critical consumers, wherein a non-critical consumer is a consumer that could be disconnected in case the battery is discharged below the predetermined state of charge threshold and wherein a critical consumer is a consumer that should not be disconnected if the battery is discharged below the predetermined state of charge threshold.

13. A battery charging and electrical energy delivery system comprising a first connection for connection to an energy source;

a second connection for connection to a battery;

a third connection for connection to a first set of consumers of electrical energy;

a first path for supplying charging current from the energy source to the battery when connected to the first and second connections respectively;

a second path, separate from said first path, for supplying electrical energy from the energy source to the first set of consumers when connected to the first and third connections respectively;

a third path for supplying electrical energy from the battery to the first set of consumers when connected to the second and third connections respectively;

a control unit for controlling the supply of electrical energy along said first, second and third paths in response to a detected state of the energy source wherein said control unit is adapted to control the supply of electrical energy along said first, second and third paths such that the battery is charged via the first path and the first set of consumers receives electrical energy via the second path, in response to detecting that the energy source is on; and the first set of consumers receives electrical energy via the third path, in response to detecting that the energy source is off; and wherein said control unit is adapted to switch the supply of electrical energy to the first set of consumers from supply via the second path to supply via the third path in response to detecting a state change of the energy source from on to off and that the off state is maintained for a predetermined second period of time.

14. The battery charging and electrical energy delivery system according to claim 13, wherein the control unit is adapted to detect the state of the energy source by monitoring a voltage level in relation to a predetermined threshold level, or by monitoring a charging indicator.

15. The battery charging and electrical energy delivery system according to claim 13, further comprising a device on the first path which is adapted to break or connect the supply of charging current along the first path, wherein said device comprises a DC/DC charger.

16. The battery charging and electrical energy delivery system according to claim 13, comprising a second relay 35 and third relay 36 adapted to break or connect the supply of electrical energy along the second and third paths respectively.

17. The battery charging and electrical energy delivery system according to claim 13, wherein the control unit is further adapted to monitor a state of charge of the battery when connected to the second connection and to break supply of electrical energy to the first set of consumers if the state of charge drops below a predetermined state of charge threshold.

18. The battery charging and electrical energy delivery system according to claim 13, wherein the control unit is adapted to monitor a state of charge of a second battery when connected to the first connection and to control the flow of electrical energy on the first path to transfer electrical energy from the second connection to the first connection to charge the second battery.

19. The battery charging and electrical energy delivery system according to claim 13 further comprising,
- an alternator, photovoltaic panel, wind generator or generator connected to the first connection,
- a battery connected to the second connection, and
- a first set of consumers connected to the third connection.

* * * * *